(12) United States Patent
Daoud

(10) Patent No.: US 6,259,024 B1
(45) Date of Patent: Jul. 10, 2001

(54) INTEGRATED BASE FIXTURE FOR A TELECOMMUNICATIONS ENCLOSURE

(75) Inventor: Bassel Hage Daoud, Parsippany, NJ (US)

(73) Assignee: Avaya Technology Corp, Basking Ridge, NJ (US)

(*) Notice: Subject to any disclaimer, the term of this patent is extended or adjusted under 35 U.S.C. 154(b) by 0 days.

(21) Appl. No.: 09/370,866

(22) Filed: Aug. 9, 1999

(51) Int. Cl.[7] .................................................. H02G 3/18
(52) U.S. Cl. ................... 174/65 G; 174/152 G; 174/153 G; 174/151; 248/56
(58) Field of Search .................. 174/65 G, 135, 174/151, 152 G, 153 G; 248/56; 16/2.1, 2.2; 385/135

(56) References Cited

U.S. PATENT DOCUMENTS

| 4,913,522 |   | 4/1990 | Nolf et al. ............................ 350/98.2 |
| 5,155,794 |   | 10/1992 | Nolf et al. ............................ 385/135 |
| 5,249,253 |   | 9/1993 | Franckx et al. ...................... 385/135 |
| 5,315,489 | * | 5/1994 | McCall et al. ....................... 174/65 R |
| 5,588,076 | * | 12/1996 | Peacock et al. ..................... 385/135 |
| 5,602,954 |   | 2/1997 | Nolf et al. ........................... 385/135 |
| 5,835,658 | * | 11/1998 | Smith ................................... 385/135 |
| 5,977,486 | * | 11/1999 | Fujita .................................. 174/152 |

OTHER PUBLICATIONS

Splice Closure Installation Instructions, 1 page, No date.

\* cited by examiner

*Primary Examiner*—Dean A. Reichard
*Assistant Examiner*—Angel R. Estrada
(74) *Attorney, Agent, or Firm*—Duane Morris & Heckscher LLP

(57) ABSTRACT

An end cap for a telecommunications enclosure has a plurality of cable receptacle tubes and a pair of pivotally mounted legs. The legs are mounted on an outside surface of the end cap. The legs are pivotable to positions in which they prevent the end cap from rolling. The legs can be pivoted to a position in which the legs fit within the perimeter of the end cap. Each leg may be shaped substantially as an arc of a circle, in which case the legs can be pivoted to a position where the legs fit in an annular region between the plurality of cable receptacle tubes and an outer edge of the end cap. Each leg includes a detente mechanism to maintain the leg in a desired position.

23 Claims, 6 Drawing Sheets

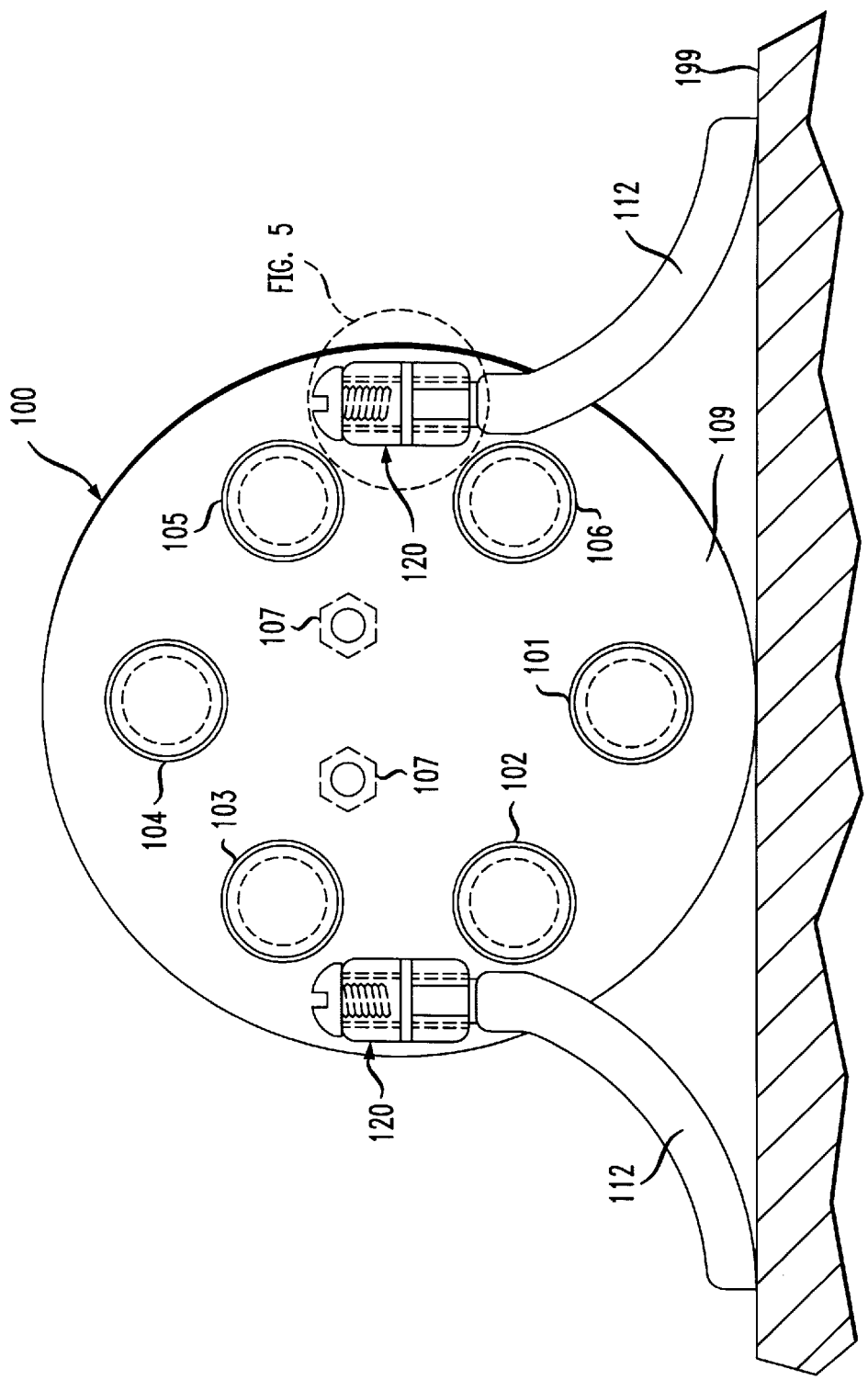

INTEGRATED BASE FIXTURE FOR A TELECOMMUNICATIONS ENCLOSURE

FIELD OF THE INVENTION

The present invention relates to telecommunications generally, and more specifically to enclosures for telecommunications cables and equipment.

DESCRIPTION OF THE RELATED ART

Optical fiber communication networks have gained wide acceptance in place of the use of electrical cable systems, due to the significantly enhanced bandwidth capabilities of optical fiber and its immunity to electromagnetic and radiomagnetic interference. Very significant advantages are achievable by the use of optical fiber rather than electrical conduction media. Nevertheless, a continuing problem with the deployment of optical fiber systems is providing a method to terminate optical fiber cables so as to make electrical or optical connections to fibers within the cables while providing adequate environmental protection and allowing for easy installation. U.S. Pat. Nos. 4,913,522, 5,155,794 and 5,602,954 to Nolf et al., and U.S. Pat. No. 5,249,253 to Franckx et al. are expressly incorporated by reference herein in their entireties. These patents describe an enclosure for a butt splice of optical fiber cables. The enclosure generally includes an end cap and a dome-shaped cover, which together form a hollow article for use as a butt splice case for optical fibre cables. Cable ports (outlets) are provided in the end cap through which the cables pass. On a new installation, only some of the outlets may be required, and some may therefore be temporarily blocked. The outlets are made with closed ends which are simply cut off as required. Typically, a blade, such as a saw, utility knife or the like is used.

Securing cables in the cable ports of the end cap in the field presents a problem. Normally, the enclosure would be mounted to a pole or, in some cases, under ground. To work on the enclosure, the enclosure is removed from its mounting. The closed end (plug) of one of the cable ports is cut after the enclosure is removed from its mounting. Both the end cap and the dome-like enclosure are typically round in shape, and tend to roll away when unrestrained. Thus, it is difficult to saw the plug of the cable port.

FIG. 1 shows a conventional apparatus 90 used to support and restrain the end cap 10 of a fiber optic enclosure (not shown) while one of the cable ports 11–15 is being cut. The apparatus 90 resembles a vise, and is effective to prevent movement or rotation of the end cap 10.

The apparatus of FIG. 1 has disadvantages. The apparatus is large and bulky, and must be carried around from one work site to the next. It can easily become lost.

An improved apparatus for supporting an end cap is desired.

SUMMARY OF THE INVENTION

The present invention is an end cap for a telecommunications enclosure. The end cap has a plurality of cable receptacle tubes. The end cap has a pair of pivotally mounted legs. The legs are pivotable to positions in which they prevent the end cap from rolling.

BRIEF DESCRIPTION OF THE DRAWINGS

FIG. 4 is a plan view of the end cap of FIG. 2, with the legs pivoted to the extended detente position.

DETAILED DESCRIPTION

Figure 1:
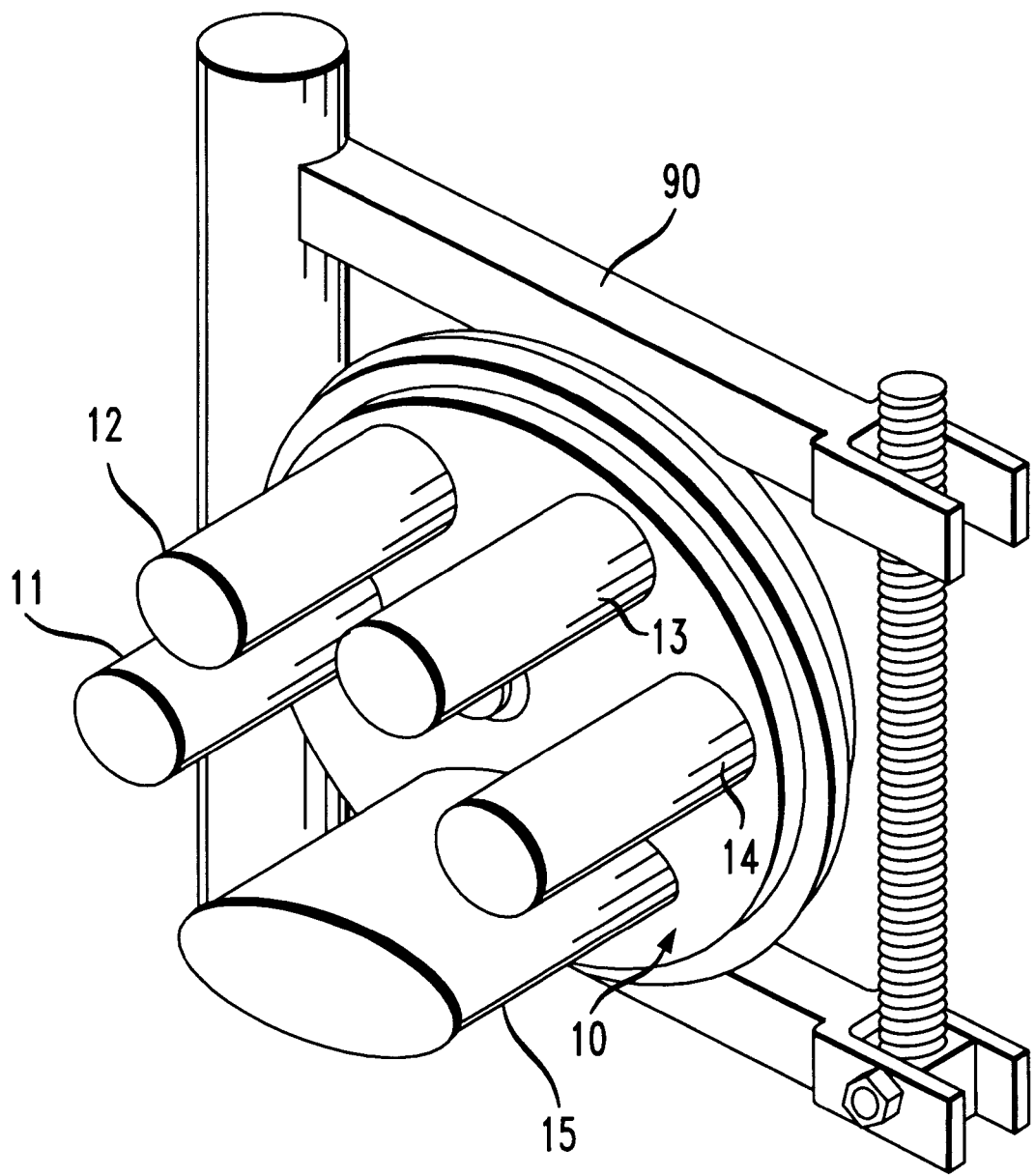
FIG. 1 is an isometric view of a conventional apparatus for supporting an end cap of a fiber optic enclosure.
Figure 3:
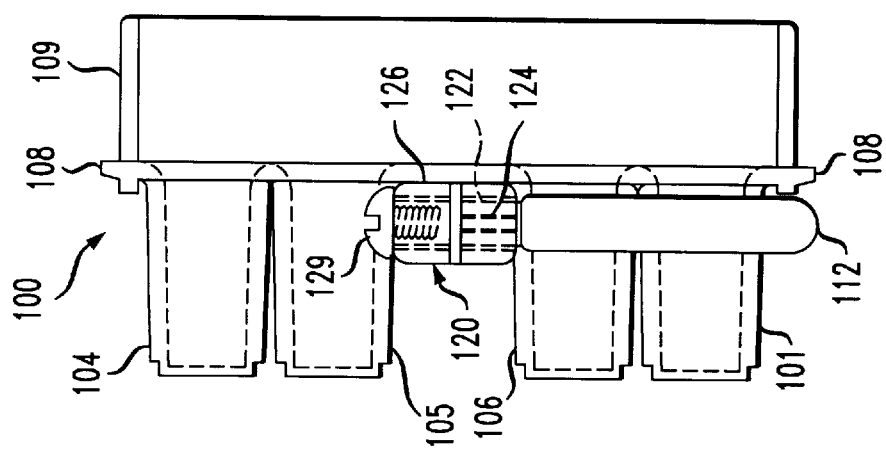
FIG. 3 is a side elevation view of the end cap of FIG. 2.
Figure 2:
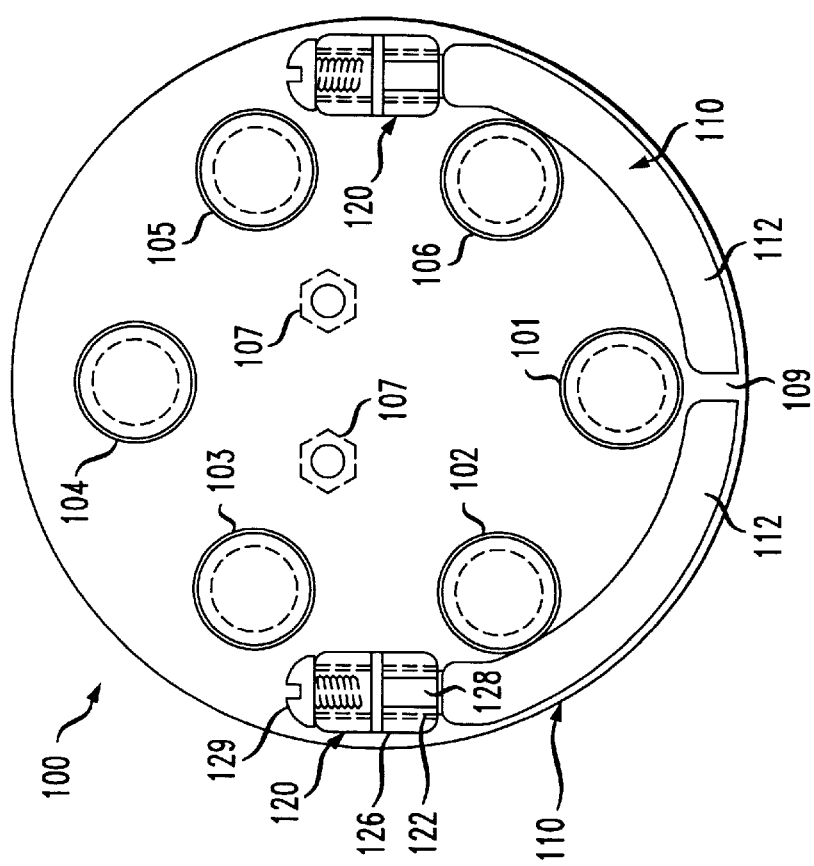
FIG. 2 is a plan view of an end cap according to a first exemplary embodiment of the invention.

FIGS. 2–4 show a first exemplary embodiment of the present invention. The present invention is an end cap 100 for a telecommunications enclosure assembly 150 (shown in FIG. 7). The end cap 100 has a plurality of cable receptacle tubes 101–106. A pair of mounting holes 107 are provided for mounting the enclosure assembly 150 on a pole or the like. The end cap 100 has a pair of leg assemblies 110. Each leg assembly 110 includes a pivotally mounted leg 112 and a detente mechanism 120. The legs 112 are pivotable to positions (shown in FIG. 4) in which they prevent the end cap 100 from rolling, regardless of whether the end cap is attached to, or detached from, the enclosure (dome) 152 (shown in FIG. 7) of the assembly 150.

As best seen in FIG. 2, the legs 112 can be pivoted to a first position in which the legs fit within the perimeter of the end cap 100. More specifically, the legs 112 fit in an annular region 109 between the plurality of cable receptacle tubes 101–106 and the outer edge of the end cap 100. Preferably, each leg 112 is shaped substantially as an arc of a circle. As shown in FIG. 2, legs thus shaped can extend substantially all of the way to the perimeter of the end cap. The interior sides of the legs 112 can approach the cable ports 101–106, so long as there is sufficient clearance between the cable ports and the legs to accommodate the heat shrink tubing, cold shrink tubing, tape or the like, that is used to secure the cables to the cable ports. Preferably, the legs 112 each extend nearly 90 degrees, so that the legs approach each other at their distal ends, as shown in FIG. 2. This is advantageous, for reasons best understood by reference to FIG. 4.

FIG. 4 shows the legs 112 in the second (extended) position. The end cap is resting on a surface 199. Because the legs 112 extend substantially to the perimeter of the end cap 100, and because the legs each extend nearly 90 degrees, the legs both reach the surface 199 while the end cap 100 rests on the surface. This is a very stable position, with three points of contact between the end cap 100 and the ground (including one point of contact for each leg 112).

Figure 7:
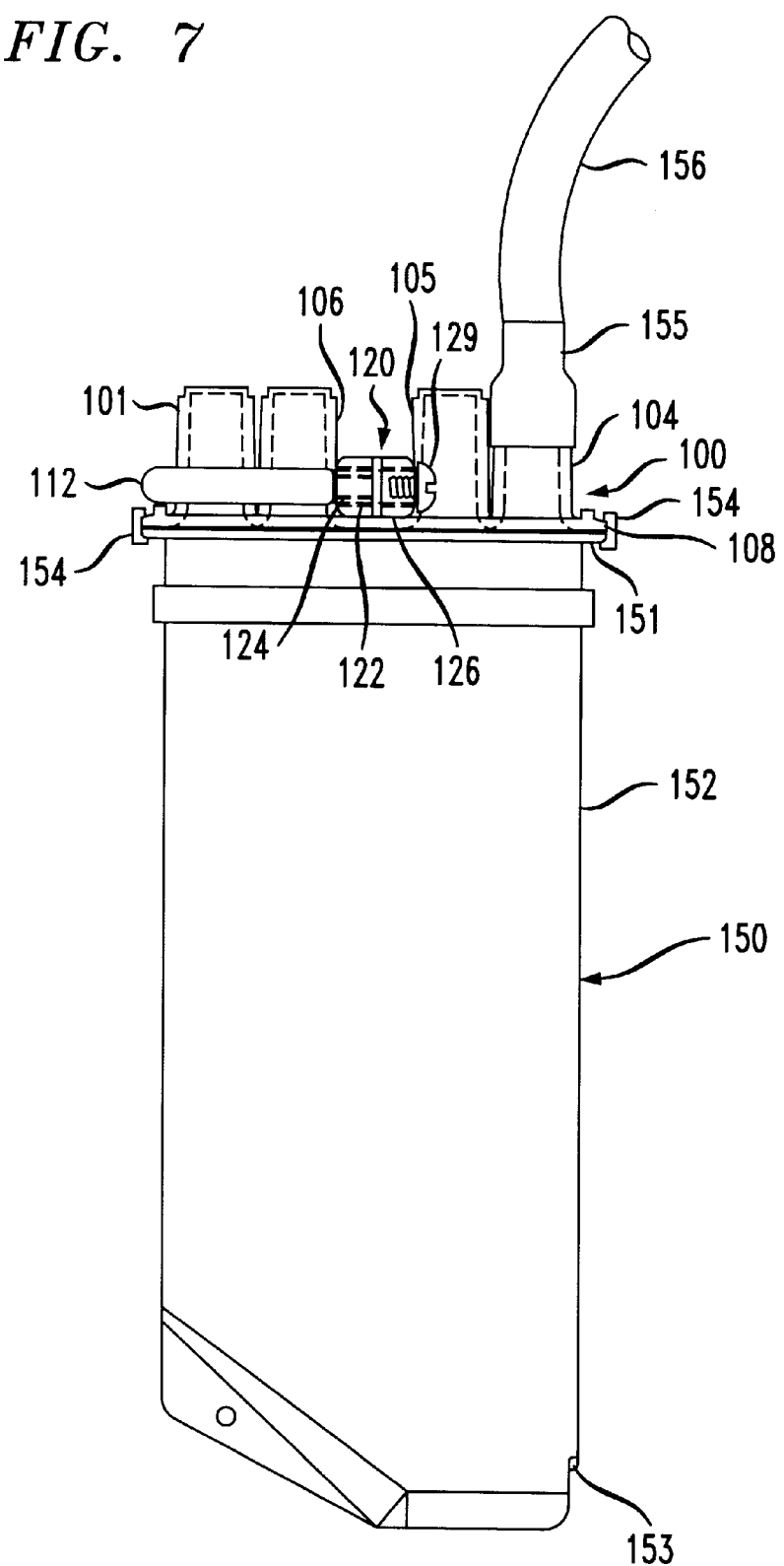
FIG. 7 is a side elevation view of a fiber optic enclosure including the end cap of FIG. 2.

In the exemplary embodiment, the legs 112 are mounted on the outside surface of the end cap 100 (best seen in FIG. 7). Thus, the legs 112 can be deployed (as shown in FIG. 4) regardless of whether the end cap 100 is secured to the enclosure 152. If the end cap 100 is secured to the enclosure 152 and the legs 112 are deployed, then the legs prevent the enclosure assembly 150 from rolling. Alternatively, the legs may be mounted on the inside surface of the end cap 100 (facing the interior of the enclosure assembly 150), but that would prevent the legs from being used while the end cap 100 is secured to the enclosure 152.

Advantageously, the legs 112 can be moved back and forth between the first position (FIG. 2) and the second position (FIG. 4) without any inference from the cables (not shown in FIGS. 2 or 4) or cable ports 101–106. Moreover, the ability to move the legs 112 does not depend on the order in which the cables are installed in the cable ports 101–106.

The legs may be formed from a variety of materials, including but not limited to stainless steel, aluminum or brass. Corrosion resistant materials are preferred.

Figure 5:
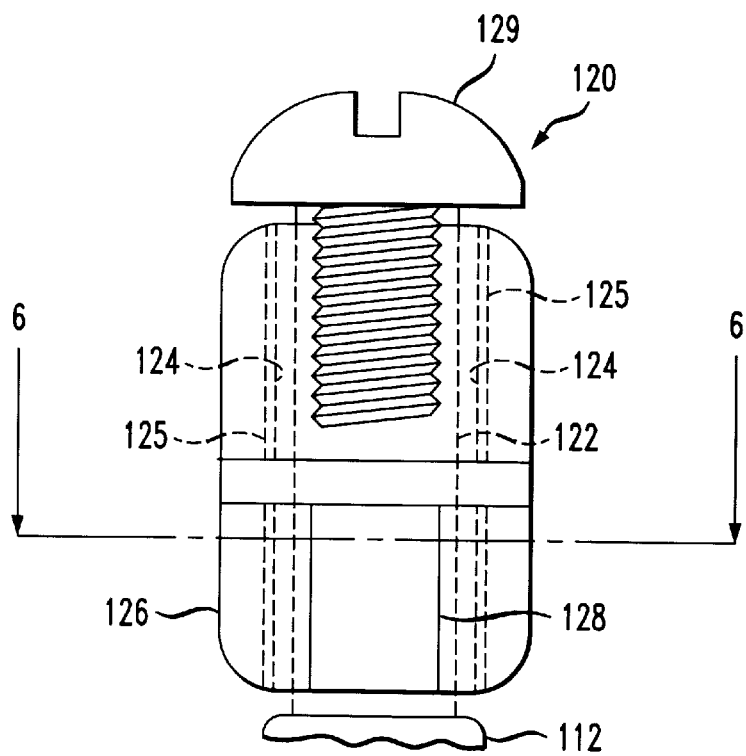
FIG. 5 is an enlarged detail of the detente mechanism shown in FIG. 4.
Figure 6:
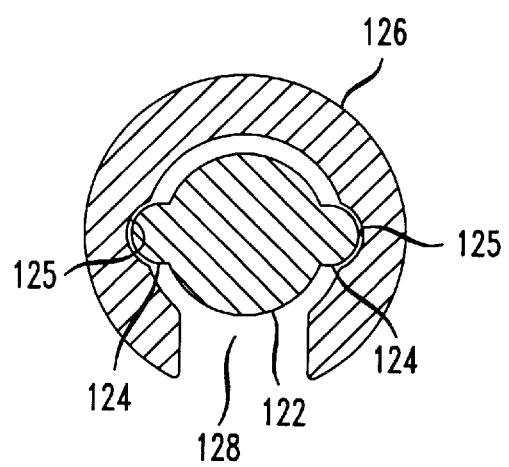
FIG. 6 is cross sectional view of the detente mechanism shown in FIG. 5, taken along section line 6—6 in FIG. 5.

According to another aspect of the invention, each leg 112 includes a detente mechanism 120 to maintain the leg in a desired position, which may be either the first position (FIG. 2) or the second position (FIG. 4). FIGS. 5 and 6 show the exemplary detente 120. Each leg 112 is integrally attached to the bottom of a pivot pin 122. The pin 122 and leg 112 may be formed of a single piece of material. The pivot pin 122 is held in place by a screw 129 or the like. The pivot pin 122 has a pair of bosses 124, one on each side. The pivot pin 122 is rotatably mounted within a C-shaped sleeve 126 having a gap 128. The sleeve 126 is firmly attached to the end cap 100, and may be formed from the same piece of material as the end cap. The sleeve 126 has a pair of grooves 125 that receive the bosses 124. Because the sleeve 126 is split, the sleeve can deform. The pivot pin 122 has two main detente positions, which are 180 degrees apart from each other. The bosses 124 fit in the slots 125 when the legs are either in the first position (FIG. 2) or the second position (FIG. 4). In these two detente positions, the bosses 124 are received by the slots 125. When a sufficient torque is applied to the pivot pin 122, the bosses 124 open up the sleeve 126 and pivot pin 122 can rotate.

The detente mechanism provides sufficient resistance to rotation so as to maintain the legs 112 stably in the second (deployed) position shown in FIG. 4. Also, torque exerted by the surface 199 on the leg 112 is not effective to move the bosses 124 out of the detentes 125, as such a torque does not tend to rotate the leg around the axis of the pivot pin 122. The legs 112 provide a wide base for supporting the end cap 100 in the desired position without rolling.

The detente mechanism 120 is only one example. Other conventional detentes may be substituted without changing the function of the invention.

FIG. 7 is a side elevation view of a telecommunications enclosure assembly 150 that includes a substantially cylindrical, dome-like enclosure 152 and the end cap 100 of FIGS. 2–6. The enclosure has a port 153 that receives a valve for pumping air into the enclosure 152.

As described above, the legs 112 are movable to the second position in which they prevent the enclosure 150 from rolling. Once the legs are deployed in the second position to prevent rolling, the end cap can be positioned stably for cutting a cable port (e.g., 104), inserting a sleeve 155 of heat shrink tubing on the cable port, and inserting the cable 156 through the sleeve and the cable port. Then the legs 112 can be returned to the first position shown in FIGS. 2 and 7, in which the legs fit within the annular region 109 between the cable ports and the perimeter of the end cap 100. The detente mechanism 120 is engaged (i.e., the bosses 124 fit within the slots 125) when the legs are returned to the first position.

As shown in FIG. 7, to assemble the enclosure assembly 150, the end cap 100 is inserted all the way into the rim of the enclosure 152. The enclosure 152 and end cap 100 have respective mating parts 151 and 108, which abut each other when the end cap is completely inserted. Once the end cap 100 is installed on the enclosure 152, a clamp 154 is applied to clamp the end cap 100 to the enclosure 152, and to keep the end cap from moving. The clamp 154 may be, for example, a V-clamp. U.S. Pat. No. 5,315,489 to McCall et al. is expressly incorporated by reference herein for its teachings on a clamp suitable for use on fiber enclosures. A clamp as described by McCall et al. may be used to clamp the enclosure assembly 150.

Figure 8:
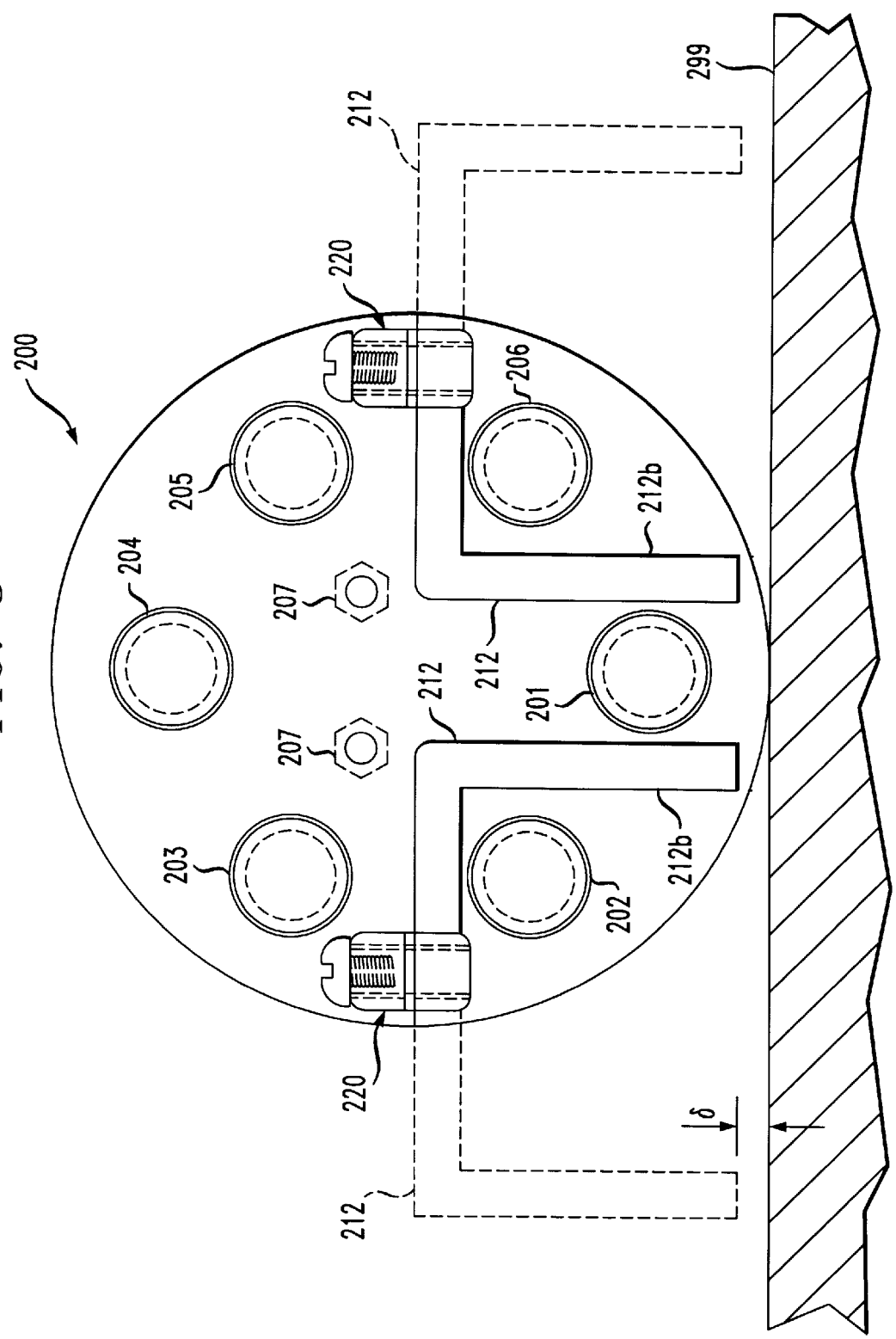
FIG. 8 is a plan view of a second exemplary end cap according to the present invention.

FIG. 8 shows a second exemplary embodiment of the invention, in which a pair of angled legs 212 are provided. The legs 212, each of which is attached to a detent mechanism 220 have a first position, in which the legs fit inside the perimeter of the end cap 100, and a second position (shown in phantom) 180 degrees apart from the first position.

In the exemplary embodiment of FIG. 8, the legs 212 fit completely within the perimeter of the end cap 200 in the first position, which means that they may terminate a small distance δ above the surface 299 when the legs 212 are in the second position. Alternatively, the bottom section 212b of each leg 212 may be extended by the length δ, in which case the legs would extend beyond the perimeter of the end cap 200 by the distance δ when the legs are in the first position. In addition, because the bottom portions 212b of the legs 212 cross over cable ports 202 and 206 when the legs 212 are moved from the first position to the second position, these two cable ports should be used last to avoid the need to detach and re-attach cables to cable ports 202 and 206 when the legs 212 are pivoted. The curved legs of FIGS. 2–4 and 7 avoid both of these problems of end cap 200, and thus may be a preferred embodiment.

The legs 112 of FIG. 2 and 212 of FIG. 8 are only exemplary in nature. Other leg shapes may be used, so long as the legs are routed around the cable receptacle tubes 101–106 when in the stowed position.

Although the exemplary embodiment is described in the context of a fiber optic enclosure, the exemplary enclosure is not limited to fiber, and may be used for other electronic equipment, where a water-tight seal is desired.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. An end cap for a telecommunications enclosure,
   said end cap having a plurality of cable receptacle tubes,
   said end cap having a pair of pivotally mounted legs, said legs being independently pivotable to positions in which they prevent the end cap from rolling.

2. The end cap of claim 1, wherein the legs can be pivoted to a position in which the legs fit within the perimeter of the end cap.

3. The end cap of claim 1, wherein each leg is shaped substantially as an arc of a circle.

4. The end cap of claim 3, wherein the legs can be pivoted to a position in which the legs fit in an annular region between the plurality of cable receptacle tubes and an outer edge of the end cap.

5. The end cap of claim 1, wherein each leg includes a detente mechanism to maintain the leg in a desired position.

6. The end cap of claim 5, wherein the detent mechanism comprises a pivot pin attached to the leg, and a sleeve, and wherein the pivot pin has a boss and is rotatably mounted within the sleeve.

7. The end cap of claim 1, wherein the legs are mounted on an outside surface of the end cap.

8. A telecommunications enclosure assembly, comprising:
   an enclosure; and
   an end cap detachably mountable to the enclosure, the end cap having a plurality of cable receptacle tubes, the end cap having a pair of pivotally mounted legs, the legs being independently movable to positions in which they prevent the enclosure from rolling.

9. The assembly of claim 8, wherein the enclosure is substantially cylindrical.

10. The assembly of claim 8, wherein the legs can be pivoted to a position in which they fit within the perimeter of the end cap.

11. The assembly of claim 8, wherein each leg is shaped substantially as an arc of a cirle.

12. The end cap of claim 8, wherein the legs can be pivoted to a position in which the legs fit in an annular region between the plurality of cable receptacle tubes and an outer edge of the end cap.

13. The assembly of claim 8, wherein each leg includes a detente mechanism to maintain the leg in a desired position.

14. The assembly of claim 13, wherein the detent mechanism comprises a pivot pin attached to the leg, and a sleeve, and wherein the pivot pin has a boss and is rotatably mounted within the sleeve.

15. The assembly of claim 8, wherein the legs are mounted on an outside surface of the end cap.

16. A method for securing a cable to a cable port of an end cap of a telecommunications enclosure, comprising the steps of:
  (a) independently pivoting a plurality of legs mounted to the end cap to respective positions to prevent the end cap from rolling; and
  (b) securing the cable to the cable port.

17. The method of claim 16, wherein:
  the pivoting step includes pivoting each leg from a first position to a second position, and
  the first position is a position in which the legs fit within the perimeter of the end cap.

18. The method of claim 17, further comprising the step of returning the legs from the second position to the first position after the securing step.

19. The method of claim 18, wherein the returning step includes pivoting the legs until a detente engages.

20. The method of claim 16, wherein:
  the pivoting step includes pivoting each leg from a first position to a second position, and
  the first position is a position in which the legs fit in an annular region between the plurality of cable receptacle tubes and an outer edge of the end cap.

21. The method of claim 20, further comprising the step of returning the legs from the second position to the first position after the securing step.

22. The method of claim 21, wherein the returning step includes pivoting the legs until a detente engages.

23. The method of claim 16, wherein the pivoting step includes pivoting the legs until a detent engages.

* * * * *